United States Patent
Stieglitz et al.

(10) Patent No.: US 11,104,195 B2
(45) Date of Patent: Aug. 31, 2021

(54) FOUR-POINT LINK

(71) Applicant: ZF FRIEDRICHSHAFEN AG, Friedrichshafen (DE)

(72) Inventors: Andre Stieglitz, Osnabruck (DE); Ingolf Müller, Minfeld (DE); Philipp Bauer, Eriskirch (DE); Manfred Bürgmann, Ravensburg (DE); Patricia Nieke, Dresden (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 40 days.

(21) Appl. No.: 16/607,643

(22) PCT Filed: Mar. 27, 2018

(86) PCT No.: PCT/EP2018/057689
§ 371 (c)(1),
(2) Date: Oct. 23, 2019

(87) PCT Pub. No.: WO2018/197132
PCT Pub. Date: Nov. 1, 2018

(65) Prior Publication Data
US 2020/0130446 A1 Apr. 30, 2020

(30) Foreign Application Priority Data
Apr. 28, 2017 (DE) .......................... 102017207166.4

(51) Int. Cl.
*B60G 7/00* (2006.01)
(52) U.S. Cl.
CPC ........ *B60G 7/001* (2013.01); *B60G 2206/121* (2013.01); *B60G 2206/7101* (2013.01);
(Continued)

(58) Field of Classification Search
CPC ........................... B60G 7/001; B60G 2206/85
See application file for complete search history.

(56) References Cited

U.S. PATENT DOCUMENTS 6,116,113 A * 9/2000 Pazdirek .................. F16C 7/026
74/579 R
2010/0127469 A1* 5/2010 Quaing .................... B60G 9/00
280/124.111

(Continued)

FOREIGN PATENT DOCUMENTS

DE  10 2005 002515   7/2006
DE  10 2004 014 610  6/2009
(Continued)

*Primary Examiner* — Paul N Dickson
*Assistant Examiner* — Daniel M. Keck
(74) *Attorney, Agent, or Firm* — Cozen O'Connor

(57) ABSTRACT

A four-point link for a wheel suspension of a vehicle includes a core element, a filament and four bushings. The filament is pre-impregnated with a resin. The core element further has a torsional element and four support arms connected integral with the torsional element. The core element and the respective bushing are at least partially wrapped by the filament. The respective bushing for receiving a respective bearing element is arranged at a respective distal end of the respective support arm. The respective bushing has at least one anchor element, and at least one undercut is formed between the at least one anchor element and the bushing, and the core element engages in the undercut for connecting the bushing to the support arm of the core element by positive engagement.

13 Claims, 4 Drawing Sheets

(52) U.S. Cl.
CPC ............... *B60G 2206/7102* (2013.01); *B60G 2206/7103* (2013.01); *B60G 2206/82* (2013.01); *B60G 2206/85* (2013.01)

(56) References Cited

U.S. PATENT DOCUMENTS

2012/0299264 A1* 11/2012 Pedersen ................ B60G 7/001
                                                          280/124.134
2015/0158361 A1* 6/2015 Eismann ................. B60G 9/00
                                                          280/124.116
2020/0282665 A1* 9/2020 Gralka ................. B29C 70/222

FOREIGN PATENT DOCUMENTS

| DE | 10 2011 079654 | 1/2013 | | |
|----|----|----|----|----|
| DE | 102017222579 A1 | * | 6/2019 | ............ B29C 53/62 |
| DE | 102018204541 A1 | * | 9/2019 | ............ B60G 7/001 |
| EP | 2982526 A1 | * | 2/2016 | ............ B60G 7/001 |
| GB | 2 154 520 | | 9/1985 | |
| WO | WO 01/77771 | | 10/2001 | |

* cited by examiner

FOUR-POINT LINK

CROSS REFERENCE TO RELATED APPLICATIONS

This is a U.S. national stage of application No. PCT/EP2018/057689, filed on Mar. 27, 2018. Priority is claimed on German Application No. DE102017207166.4, filed Apr. 28, 2017, the entire content of which is incorporated herein by reference.

FIELD OF THE INVENTION

The present invention is directed to a four-point link for a wheel suspension of a vehicle, particularly for a wheel suspension of a passenger motor vehicle or utility motor vehicle.

BACKGROUND OF THE INVENTION

Four-point links are used particularly in utility vehicles in order to guide a rigid axle in a sprung manner in a vehicle frame. The four-point link is responsible for transverse guidance and longitudinal guidance of the axle. Further, the four-point link performs the function of a stabilizer.

A four-point link for axle suspension of a rigid axle, particularly of a utility vehicle, is known from DE 10 2004 014 610 A1 the entire content of which is hereby incorporated herein by reference. The four-point link has four bearing eyes, two of which are connectable in an articulated manner to the axle, and two of which are connectable in an articulated manner to the vehicle frame. The four-point link is formed as a one-piece, twistable hollow housing defined by the bearing eyes to be rectangularly or trapezoidally shaped. The hollow housing is substantially formed by a tube which is arranged horizontally with respect to the vehicle and is open on a plurality of sides with a cross section which is substantially rounded in shape from a rectangle to an O-shape.

It is an object of the present invention to further develop a four-point link for a wheel suspension of a vehicle in which, in particular, large-series production is facilitated and the production process is accelerated.

SUMMARY OF THE INVENTION

A four-point link, according to the invention, for a wheel suspension of a vehicle comprises a core element, a filament and four bushings, the filament being pre-impregnated with a resin, the core element further having a torsional element and four support arms connected integral with the torsional element. The core element and the respective bushing are at least partially wrapped by the filament, and the respective bushing for receiving a respective bearing element is arranged at a respective distal end of the respective support arm. The respective bushing has at least one anchor element. At least one undercut is formed between the at least one anchor element and the bushing, and the core element engages in the undercut for connecting the bushing to the support arm of the core element by positive engagement.

By "wheel suspension" is meant an arrangement which couples the wheels of the vehicle to a body and/or a frame of the vehicle so as to be steerable and/or in a sprung manner. The vehicle can be a motor vehicle, particularly a utility motor vehicle, but also a passenger motor vehicle.

The core element is provided substantially to give form to the four-point link. Therefore, the core element is provided not to receive loads but rather exclusively to accommodate filament or to be wrapped by the filament. In other words, the loads and forces which are conducted through a vehicle axle or a wheel carrier are received only by the outer skin of the four-point link formed from the filament. Therefore, the filament is connected to the four bushings at least by frictional engagement. Additionally, the filament may also be connected to the four bushings by positive engagement.

The four support arms are provided to couple the vehicle axle or the wheel carrier to a frame and/or a body of the vehicle. To this end, two support arms are connected in an articulated manner to the vehicle axle or to the wheel carrier, while the other two support arms are connected in an articulated manner to the body or to the frame of the vehicle. The support arms are connected to one another via the torsional element. As used herein "articulated" means the ability to rotate around at least one axis. The torsional element serves to stabilize the four support arms with respect to swiveling. The support arms and the torsional element are arranged in such a way that a swiveling of the respective support arm, i.e., a rotation of the respective support arm around the torsional axis, accompanies torsion of the torsional element. Torsion comes about as a result of a moment of torsion exerted by the respective support arm on the torsional element during the swiveling.

Due to production, particularly owing to the filament orientation during winding, the four-point link according to the invention allows adjustment of a defined torsional rigidity with respect to roll stabilization, a high lateral rigidity for guiding the axle, a determined longitudinal compliance with respect to improved comfort and makes it possible to represent defined kinematics or elasto-kinematics over the spring deflection. In particular, it is possible to reproduce the kinematics virtually in its entirety through the four-point link itself and, accordingly, to unload the bearing elements received in the bushings, particularly rubber bearings.

The anchor element of the respective bushing is provided substantially to connect the bushing to the support arm by positive engagement. In particular, the anchor element conducts tensile and compressive longitudinal forces, lateral forces and vertical forces into the four-point link. The vertical forces in particular are transmitted from the bushing into the four-point link by the positive engagement. Further, the positive engagement connection between the respective bushing and the respective support arm counteracts centrifugal forces during the winding process.

An inventive embodiment of the at least one anchor element provides that an undercut or undercut structure is formed between the tubular bushing portion and the anchor element. The undercut is filled with the foam-like material of the core element during production of the core element and accordingly connects the bushing to the core element by positive engagement and additionally prevents it from rotating. Consequently, there is already a positive engagement connection between the respective bushing and the support arm in longitudinal direction of the support arm at the beginning of the winding process so that the winding process can be sped up earlier or can be carried out at a high speed from the beginning. The production process of the four-point link according to the invention is substantially accelerated in this way.

The filament or group of filaments preferably comprises a plurality of continuous fibers which are surrounded by a resin. By "group of filaments" is meant a plurality of filaments which are combined in a bundle. This bundle in turn constitutes a filament. In particular, the filament can be impregnated immediately before winding around the core element, or a filament which is pre-impregnated with resin, in particular a so-called towpreg semifinished product or prepeg filament, can be used. In the wet winding method, the filament is impregnated in a resin immediately before winding and is wound around the core element. A maximum depositing speed of filament on the core element of approximately 0.5 m/s is possible due to the resin loss owing, for example, to centrifugal forces during winding. On the other hand, the depositing speed may be substantially increased by using the pre-impregnated filaments because the resin has a higher viscosity and centrifugal forces therefore have less of an influence. Consequently, the filament is formed from fiber-reinforced plastic composite material. The filament is preferably formed from a carbon fiber-reinforced plastic, a glass fiber-reinforced plastic, an aramid fiber-reinforced plastic or another suitable fiber-reinforced plastic composite material.

In a preferred further development of the component, the filament is tensioned, i.e., acted upon by a force which causes a tensioning of the filament. As a result, the filament is connected by frictional engagement to the respective support arm and the torsional element. The filament preferably runs in such a way that a swiveling of the respective support arm through the frictional engagement of the filament with the support arm induces a force acting on the filament which in turn is transmitted to the torsional element via the frictional engagement between the filament and the torsional element. The induced force causes an increase in the tension of the filament.

The at least one anchor element is preferably connected integral with the respective bushing via at least one web. The at least one web has a respective guide surface for receiving and guiding the filament. In this way, a frictional engagement connection is formed between the web and the filament portion coming in contact with the latter. Consequently, the at least one web is provided as connecting element between the annular bushing portion and the anchor element.

The respective bushing preferably has two webs which surround a void. The two webs run together in direction of the support arm and lead into the anchor element. The at least one anchor element has two slots which form the respective undercut for receiving the core element and are provided for the positive engagement connection of the bushing to the support arm of the core element. The void serves in particular to reduce the mass of the bushing and is accordingly empty or merely filled with air. However, it is also conceivable to fill the void with a filler material, in particular a foamed material.

According to a preferred embodiment, the respective bushing has two guide arms for receiving and guiding the filament. The guide arms are arranged tangential to the annular bushing portion of the bushing and are formed substantially parallel to one another. The two guide arms improve a frictionally engaging connection particularly between the bushing and the filament, but also between the bushing and the respective support arm by means of a larger connection surface.

Further preferably, the at least one anchor element has at least one flank for receiving and guiding the filament to a crossover point. The guide surfaces are located in a plane with the respective flank of the anchor element. Alternatively, the at least one anchor element can also have two or more flanks. By "crossover point" is meant the point at which two filament portions cross one another during the winding process. Accordingly, with each winding around the bushing, at least two portions of the filament lie directly on top of one another and form a crossover point. In order to prevent overlaying of a plurality of crossover points and, accordingly, to reduce the height of the crossover point, the filament portions can be displaced widthwise so that the width of the crossover point increases. In particular, the guiding of the filament and formation of the crossover point forms a lattice by which an improved absorption and distribution of loads is realized. Consequently, the filament winding forms a fiber lattice through selective guidance of the filament.

Alternatively, at least two anchor legs can be formed at the anchor element. A cutout is formed between the anchor legs which enlarges the contact surface of the anchor element at the core element and prevents the occurrence of splitting tensile forces and splitting compressive forces at the crossover point of the filament portions. Accordingly, compressive stresses can be better transmitted from the bushing into the four-point link, since stress peaks due to splitting tensile forces at the crossover point of the filament portions are prevented.

The respective bushing preferably has two anchor elements which converge at the crossover point for receiving and guiding the filament and are connected to one another at a vertex, at least one recess being formed at the vertex for receiving the core element in direction of the bushing. The core element engages in the undercut for the positive engagement connection of the bushing to the support arm of the core element. The at least one recess divides the two anchor elements at least partially or by sections into at least two parts. The vertex connecting the two anchor elements to one another is preferably rounded. There is advantageously an improved distribution of tension, and stress peaks are prevented at the crossover point of the filament.

The invention includes the technical teaching that exactly one filament is wound multiple times around the core element and the respective bushing. In particular, the filament has a length of 7 km to 11 km, preferably 9 km, and is wound off from a winding axis in an automated manner and wound onto the core element by means of a robot to form the four-point link. Further, however, it is also conceivable that two or more robots simultaneously wrap a respective filament around the core element to form the four-point link.

The core element is preferably formed from a foamed material. In particular, the core element is formed from a solid, lightweight, permanent foamed material. The foamed material is preferably formed from a polymer, for example, from polyurethane, polystyrene or polymethacrylimide. Further, the core element can also be formed as in-line core, disposable core or blow core. It is essential in particular that the core element can be wrapped with the filament and thus serves to impart shape.

The respective bushing is preferably formed from a metal material. In particular, the bushing is formed from a steel alloy or light metal alloy, particularly an aluminum alloy or magnesium alloy. Further, the bushing is formed by extrusion. Further, the bushing is at least partially glued to the core element.

According to a preferred embodiment example, the filament is guided at the respective support arm substantially parallel to a respective longitudinal axis of the respective support arm. The filament is preferably wound radially around the respective support arm and the torsional element which is connected integral with the latter. In particular, the two support arms of the torsional element on the frame side are bent such that the filament can be deposited on the core element in a continuous winding process. The support arms are provided substantially to absorb bending.

The filament is preferably guided at a respective end face of the respective support arm in an angle range of from 15° to 45° relative to a respective longitudinal axis of the respective support arm. This makes it possible, e.g., to absorb shear stresses which are generated from transverse forces. The filament is preferably wound around the support arms at the respective end face in a lattice-like manner. In this way, the respective support arm is reinforced in a lightweight manner.

Further preferably, the filament is guided at the torsional element in an angle range of from 40° to 60° relative to a longitudinal axis of the four-point link. The torsional element is loaded particularly by shear stresses developing from a torsion. In particular, the entire surface of the torsional element is covered with the filament, particularly wrapped multiple times. The entire surface of the core element is preferably covered with the filament, particularly wrapped multiple times.

The respective bushing preferably has a greater width than the respective core element of the support arm to guide the filament during a winding process. This aids the required guiding of the filament in the area of the bushing. The filament is guided directly around the bushing and along the core element. The anchor element formed at the respective bushing allows the filament to be guided parallel to the support arm and particularly at an angle defined by the anchor element.

BRIEF DESCRIPTION OF THE DRAWINGS

Preferred embodiment examples of the invention will be described more fully in the following with reference to the drawings in which identical or like elements are provided with identical reference numerals. The drawings show.

DETAILED DESCRIPTION OF THE PRESENTLY PREFERRED EMBODIMENTS

Figure 1:
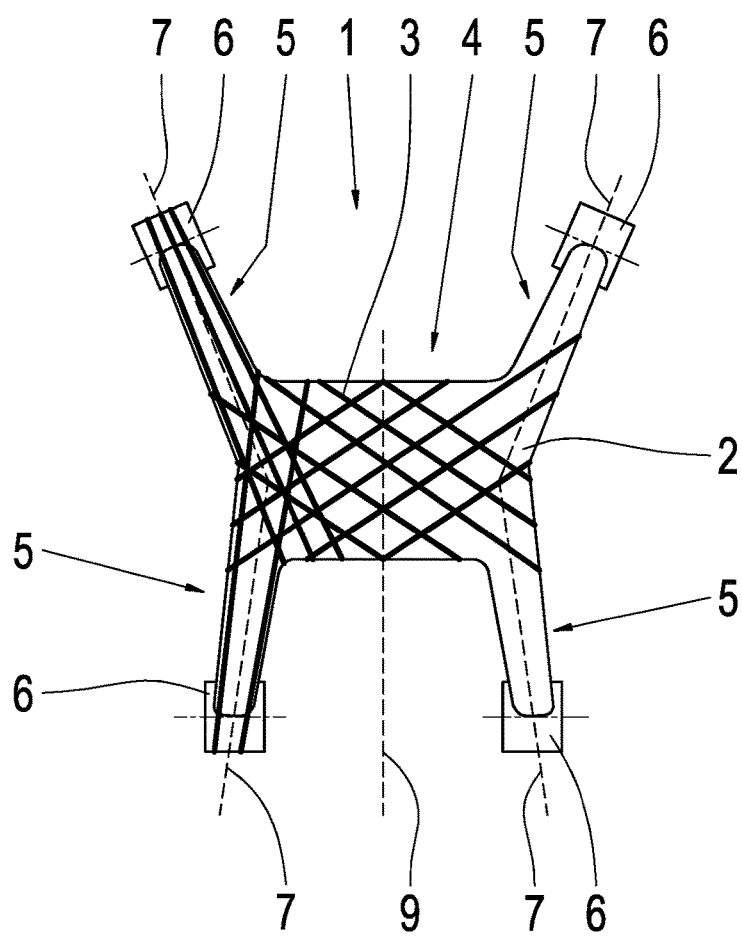
FIG. 1 a schematic top view of a four-point link according to the invention.

According to FIG. 1, a four-point link 1 according to the invention for a wheel suspension—not shown—of a vehicle—not shown—comprises a core element 2, a filament 3 and four bushings 6. Filament 3 is shown by way of example in a highly schematic manner. In particular, filament 3 substantially forms the entire surface of the four-point link 1. Core element 2 comprises a torsional element 4 and four support arms 5 connected integral with torsional element 4. The respective bushing 6 for receiving a respective bearing element—not shown—particularly molecular joint, is arranged at a respective distal end of the respective support arm 5 and is connected via positive engagement to the respective support arm 5. Four-point link 1 is used, for example, in a tractor-trailer as chassis connection and, in so doing, assumes the tasks of a three-point link and stabilizer. Consequently, the four-point link 1 is responsible for transverse guiding and, to a decisive extent, for the longitudinal guiding of the axle. Further, roll stabilization is also represented by the four-point link 1.

Because core element 2 and respective bushing 6 are at least partially wrapped with filament 3, the respective bushing 6 and filament 3 are connected to one another at least by frictional engagement. Core element 2 is not load-carrying and only serves to provide shape for the filament 3. Filament 3 comprises a plurality of continuous fibers and is pre-impregnated with a resin. On the other hand, core element 2 is formed from a foamed material. Further, the respective bushing 6 is formed from a metal material, particularly aluminum, in an extrusion process. Core element 2, filament 3 and the four bushings 6 are constructed quasi-integral and intrinsically joined. Exactly one filament 3 is wound multiple times around core element 2 and the respective bushing 6. Filament 3 is guided at the respective support arm 5 substantially parallel to a respective longitudinal axis 7 of the respective support arm 5 in order to absorb flexural stresses. Further, filament 3 is guided at torsional element 4 at an angle of approximately 50° with respect to a longitudinal axis 9 of four-point link 1 in order to absorb shear stresses from torsion.

Figure 2:
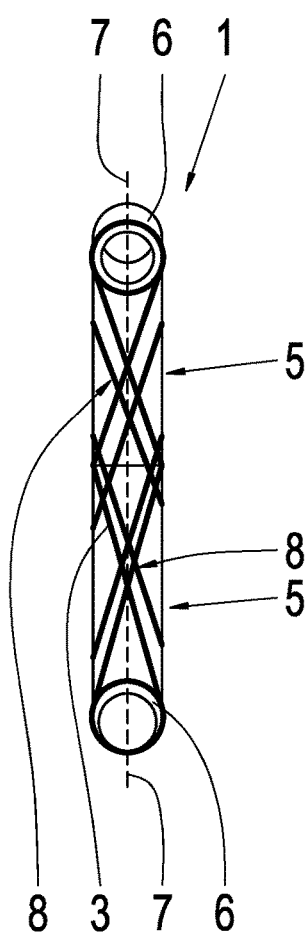
FIG. 2 a schematic front view of the four-point link according to the invention according to FIG. 1.

FIG. 2 shows a side view of the four-point link 1 shown in FIG. 1. Filament 3 is guided at a respective end face 8 of the respective support arm 5 at an angle of approximately 20° with respect to a respective longitudinal axis 7 of respective support arm 5 in order to absorb shear stresses from a transverse force. The flat structure of core element 2 which goes along with the flat structure of the finished four-point link 1 is shown particularly in FIG. 2. Installation space is saved in this way. Further, the respective distal end of the respective support arm 5 is formed so as to at least partially complement the respective bushing 6.

Four embodiment examples of the respective bushing 6 of the four-point link 1 according to the invention are shown by way of example in FIGS. 3A to 6B. In particular, a distal end of one of the four support arms 5 is shown. One of the four support arms 5 will be described in the following, but this description also applies to the other three support arms 5 of core element 2 which are constructed in an identical manner. Bushing 6 is connected integral with an anchor element 10. Anchor element 10 is provided for connecting bushing 6 to support arm 5 of core element 2 by positive engagement. Anchor element 10 is provided for conducting centrifugal forces occurring during a winding process into support arm 5. Accordingly, the winding process can be carried out at high speed from the outset. Bushing 6 has a greater width than the respective support arm 5 in order to guide filament 3 during the winding process.

Figure 3A:
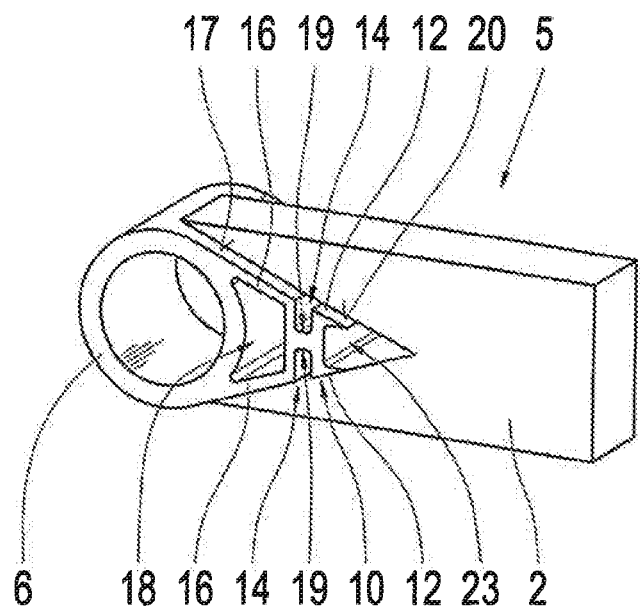
FIG. 3A a schematic perspective view of a bushing according to a first embodiment arranged at a support arm which is partially shown.
Figure 3B:
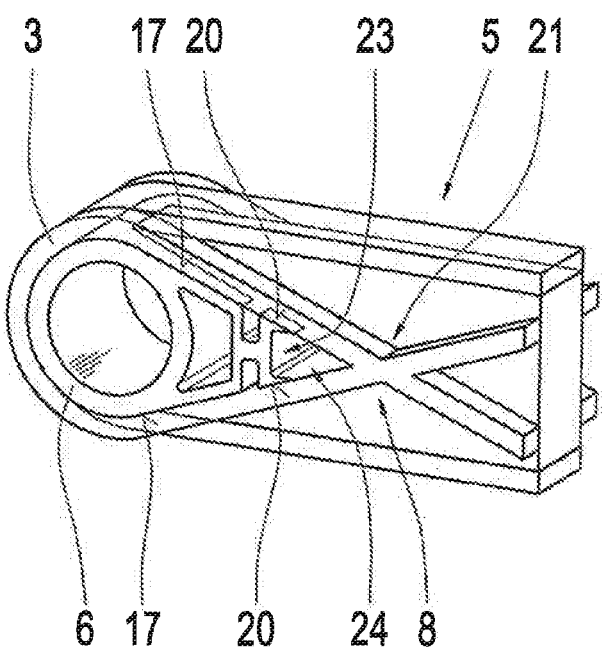
FIG. 3B a schematic perspective view of the bushing to illustrate a winding by a filament according to FIG. 3A.

According to FIGS. 3A and 3B, anchor element 10 is formed integral with the bushing 6 via two webs 16 in a first embodiment example. Consequently, bushing 6 has two webs 16 enclosing a void 18. The two webs 16 converge in direction of anchor element 10 and enter into anchor element 10. A slot 19 forming an undercut 14 in each instance for receiving core element 2 is formed in each instance spatially between anchor element 10 and bushing 6 at anchor element 10 on each side. Core element 2, from which support arm 5 is formed, engages in the undercut 14 and connects bushing 6 to support arm 5 of core element 2 by positive engagement. Further, the respective web 16 forms a respective guide surface 17 for receiving and guiding the filament 3 shown in FIG. 3B is a partially transparent view to show how the various component parts are interrelated. Two anchor legs 12 are formed at anchor element 10, and a cutout 23 which enlarges a contact surface of anchor element 10 at support arm 5 of core element 2 is formed between the anchor legs 12. The respective guide surfaces 17 are located in a plane with a flank 20 of the respective anchor leg 12.

According to FIG. 3B, filament 3 contacts the two guide surfaces 17 and the two flanks 20 and is guided via the two flanks 20 to a common crossover point 21. Further, filament 3 is also guided radially around bushing 6 and in longitudinal direction along support arm 5. Filament 3 is guided at the respective end face 8 of support arm 5 at an angle of approximately 20° in longitudinal direction of support arm 5 in order to absorb shear stresses from transverse forces, this angle being adjusted by the geometry of the anchor element 10. In cutout 23, core element 2 forms a portion 24 which converges in a point and which is provided for receiving and guiding filament 3 to crossover point 21.

Figure 4A:
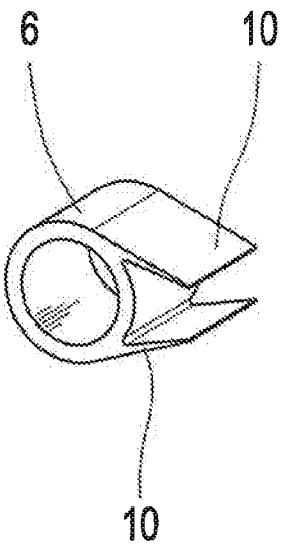
FIG. 4A a schematic perspective view of a bushing according to a second embodiment.
Figure 4B:
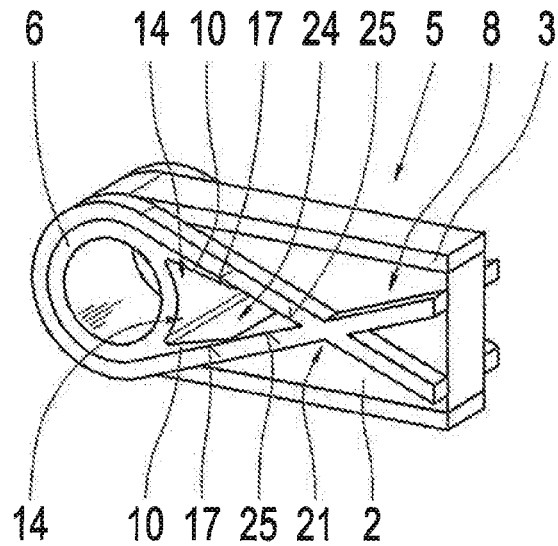
FIG. 4B a schematic perspective view of the bushing to illustrate a winding by a filament according to FIG. 4A.

According to FIG. 4B, bushing 6 has two anchor elements 10 in a second embodiment example. The two anchor elements 10 converge at an angle of approximately 20° with respect to the longitudinal axis of the support arm 5 shown in FIG. 4B.

According to FIG. 4B, an undercut 14 is formed spatially between the respective anchor element 10 and bushing 6. Core element 2, from which support arm 5 is formed, engages in undercut 14 and connects bushing 6 to support arm 5 of core element 2 by positive engagement. Further, anchor elements 10 form a respective guide surface 17 for receiving and guiding filament 3 and are formed obtuse in direction of crossover point 21 so that stress peaks can be reduced because of an improved stress pattern. Core element 2 engaging in undercut 14 further forms a portion 24 which comes to a point and which is provided for receiving and guiding filament 3 to crossover point 21. Portion 24 has respective guide surfaces 25 which are in a plane with the respective guide surface 17 of the respective anchor element 10. Filament 3 comes in contact with guide surfaces 17, 25 and is guided to a common crossover point 21. Further, filament 3 is also guided radially around bushing 6 and in longitudinal direction along support arm 5. Filament 3 is guided at the respective end face 8 of support arm 5 at an angle of approximately 20° in longitudinal direction of support arm 5 in order to absorb shear stresses from transverse forces. This angle is adjusted by the geometry of the respective anchor element 10.

Figure 5A:
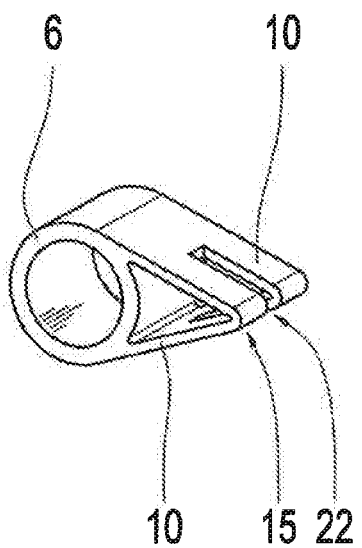
FIG. 5A a schematic perspective view of a bushing according to a third embodiment.
Figure 5B:
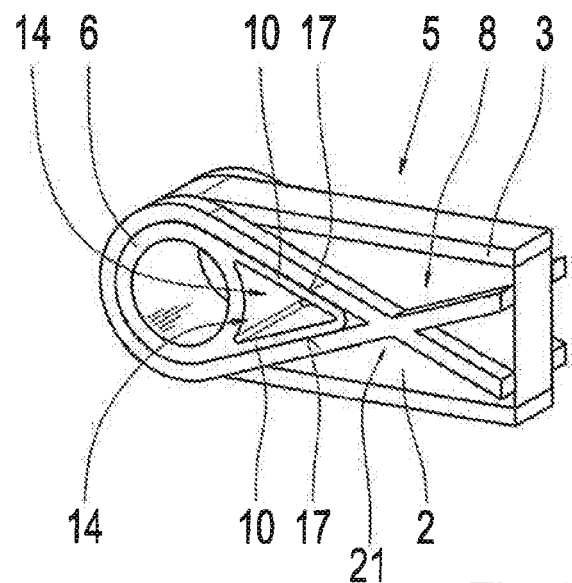
FIG. 5B a schematic perspective view of the bushing to illustrate a winding by a filament according to FIG. 5A.

According to FIG. 5A, the respective bushing 6 in a third embodiment example has two anchor elements 10 which converge to a crossover point 21 shown in FIG. 5B for receiving and guiding filament 3. The two anchor elements 10 are connected to one another at a rounded vertex 15. A recess 22 is formed at vertex 15 transverse to the two anchor elements 10 and extends from vertex 15 in direction of the tubular portion of bushing 6. Recess 22 allows core element 20 to penetrate undercut 14. Further, recess 22 is produced in a process step subsequent to the extrusion process, for example, by cutting. Alternatively, a plurality of recesses 22 can also be formed.

In FIG. 5B, recess 22 receives core element 2. Core element 2 engages in undercut 14 for connecting bushing 6 to support arm 5 by positive engagement. Filament 3 comes in contact with a guide surface 17 of the respective carrier element 10 and is guided to a common crossover point 21. Further, filament 3 is also guided radially around bushing 6 and in longitudinal direction along support arm 5. Filament 3 is guided at respective end face 8 of support arm 5 at an angle of approximately 20° in longitudinal direction of support arm 5 in order to absorb shear stresses from transverse forces. This angle is adjusted by the geometry of the respective anchor element 10.

Figure 6A:
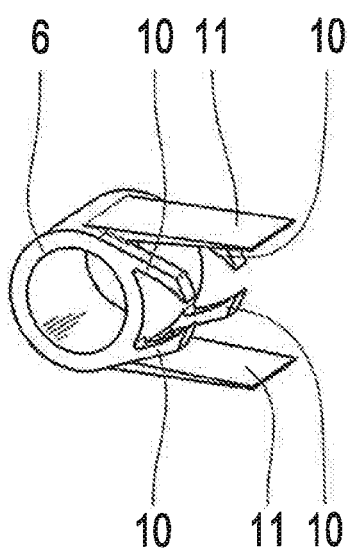
FIG. 6A a schematic perspective view of a bushing according to a fourth embodiment.
Figure 6B:
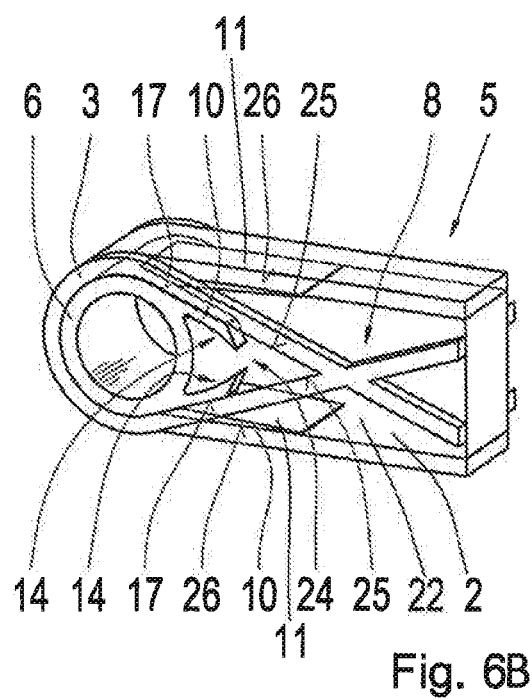
FIG. 6B a schematic perspective view of the bushing to illustrate a winding by a filament according to FIG. 6A.

According to FIG. 6A, respective bushing 6 in a fourth embodiment example has four anchor elements 10 which converge at a crossover point 21 shown in FIG. 6B for receiving and guiding the filament 3 but do not touch. Anchor elements 10 are formed to be obtuse in direction of crossover point 21 so that stress peaks can be reduced owing to an improved stress flow. Further, bushing 6 has two guide arms 11 which are arranged axially between anchor elements 10 with respect to the longitudinal axis of the bushing, and two anchor elements 10 are arranged, respectively, axially in front of and behind the guide arms 11.

FIG. 6B is a partially transparent view to show how the various component parts are interrelated and shows that guide arms 11 have the same width as support arm 5, one guide arm 11 being arranged at an upper side of support arm 5 and one guide arm 11 being arranged at a lower side of support arm 5. Guide arms 11 increase the adhesion surface between bushing 6 and filament 3, bushing 6 being connected to filament 3 at least by frictional engagement. An undercut 14 is formed spatially between anchor element 10 and tubular portion of bushing 6. Core element 2 engages in undercut 14 for connecting bushing 6 to support arm 5 by positive engagement. Core element 2 further forms a portion 24 which comes to a point and which is provided for receiving and guiding filament 3 to crossover point 21. Portion 24 has respective guide surfaces 25 which are located in a plane with respective guide surface 17 of respective anchor element 10. Filament 3 comes in a contact with guide surfaces 17, 25 and is guided to the common crossover point 21. Further, filament 3 is also guided radially around bushing 6 and in longitudinal direction along guide surfaces 26 of guide arm 11 and along support arm 5. Accordingly, a frictional engagement connection is further formed between bushing 6 and filament 3. Filament 3 is guided at respective end face 8 of support arm 5 at an angle of approximately 20° in longitudinal direction of support arm 5 in order to absorb shear stresses from transverse forces. This angle is adjusted by the geometry of respective anchor element 10.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A four-point link for a wheel suspension of a vehicle comprising:
    a core element having a torsional element and four support arms connected integral with the torsional element;
    a filament; and
    four bushings;
    wherein the filament is pre-impregnated with a resin, and the core element and a respective one of the four bushings are at least partially wrapped by the filament;
    wherein the respective one of the four bushings for receiving a bearing element is arranged at a distal end of the respective one of the of the four support arms,
    wherein the respective one of the four bushings has at least one anchor element,
    wherein at least one undercut is formed between the at least one anchor element and the respective one of the four bushings, and
    wherein the core element engages in the undercut for connecting the respective one of the four bushing to the respective one of the four support arms of the core element by positive engagement.

2. The four-point link according to claim 1, wherein the at least one anchor element is connected integral with the respective one of the four bushings via at least one web, and wherein the at least one web has a respective guide surface for receiving and guiding the filament.

3. The four-point link according to claim 1, wherein the respective one of the four bushings has two webs which surround a void, wherein the two webs run together in direction of the respective one of the four support arms and lead into the at least one anchor element, and wherein the at least one anchor element has two slots which form the respective undercut for receiving the core element and are provided for the positive engagement connection of the respective one of the four bushings to the respective one of the four support arms of the core element.

4. The four-point link according to claim 1, wherein the respective one of the four bushings has two guide arms for receiving and guiding the filament.

5. The four-point link according to claim 1, wherein the at least one anchor element has at least one flank for receiving and guiding the filament to a crossover point.

6. A four-point link for a wheel suspension of a vehicle comprising:
    a core element having a torsional element and four support arms connected integral with the torsional element;
    a filament; and
    four bushings;
    wherein the filament is pre-impregnated with a resin, and the core element and a respective one of the four bushings are at least partially wrapped by the filament;
    wherein the respective one of the four bushings for receiving a bearing element is arranged at a distal end of the respective one of the of the four support arms,
    wherein the respective one of the four bushings has at least one anchor element,
    wherein at least one undercut is formed between the at least one anchor element and the respective one of the four bushings,
    wherein the core element engages in the undercut for connecting the respective one of the four bushing to the respective one of the four support arms of the core element by positive engagement, and
    wherein the respective one of the four bushings has two anchor elements which converge at a crossover point for receiving and guiding the filament and are connected to one another at a vertex, wherein at least one recess is formed at the vertex for receiving the core element in direction of the respective one of the four bushings, and wherein the core element engages in the undercut for the positive engagement connection of the respective one of the four bushings to the respective one of the four support arms of the core element.

7. The four-point link according to claim 1, wherein exactly one filament is wound multiple times around the core element and the respective one of the four bushings.

8. The four-point link according to claim 1, wherein the core element is formed from a foamed material.

9. The four-point link according to claim 1, wherein the respective bushing is formed from a metal material.

10. The four-point link according to claim 1, wherein the filament is guided at the respective one of the four support arms substantially parallel to a respective longitudinal axis of the respective one of the four support arms.

11. The four-point link according to claim 1, wherein the filament is guided at an end face of the respective one of the four support arms in an angle range of from 15° to 45° relative to a longitudinal axis of the respective one of the four support arms.

12. The four-point link according claim 1, wherein the filament is guided at the torsional element in an angle range of from 40° to 60° relative to a longitudinal axis of the four-point link.

13. The four-point link according to claim 1, wherein the respective one of the four bushings has a greater width than the respective one of the four support arms to receive and guide the filament during a winding process.

* * * * *